(12) United States Patent
Ishikawa

(10) Patent No.: US 7,919,966 B2
(45) Date of Patent: Apr. 5, 2011

(54) METHOD OF ESTIMATING SURFACE ION DENSITY

(75) Inventor: Yosuke Ishikawa, Farmington Hills, MI (US)

(73) Assignee: Honda Motor Co., Ltd., Tokyo (JP)

(*) Notice: Subject to any disclaimer, the term of this patent is extended or adjusted under 35 U.S.C. 154(b) by 406 days.

(21) Appl. No.: 12/236,103

(22) Filed: Sep. 23, 2008

(65) Prior Publication Data
US 2010/0072955 A1     Mar. 25, 2010

(51) Int. Cl.
*G01R 33/12*     (2006.01)
(52) U.S. Cl. ......................... 324/426; 324/432
(58) Field of Classification Search .................. None
See application file for complete search history.

(56) References Cited

U.S. PATENT DOCUMENTS

| | | | |
|---|---|---|---|
| 5,982,152 A | 11/1999 | Watanabe et al. | |
| 6,016,047 A | 1/2000 | Notten et al. | |
| 6,215,281 B1 | 4/2001 | Koch | |
| 6,262,577 B1 | 7/2001 | Nakao et al. | |
| 6,277,515 B1 * | 8/2001 | Akahira | 429/152 |
| 6,362,598 B2 | 3/2002 | Laig-Horstebrock et al. | |
| 6,522,148 B2 | 2/2003 | Ochiai et al. | |
| 6,646,419 B1 | 11/2003 | Ying | |
| 7,078,907 B2 | 7/2006 | Uesaka et al. | |

(Continued)

FOREIGN PATENT DOCUMENTS

EP     2048763 A1     4/2009

(Continued)

OTHER PUBLICATIONS

G. Ning; B.N. Popov, "Cycle Life Modeling of Lithium-Ion Batteries," Journal of Electrochemical Society, vol. 151 (2004), pp. A1584-A1591.

(Continued)

*Primary Examiner* — Minh N Tang
(74) *Attorney, Agent, or Firm* — Capitol City TechLaw, PLLC; Mark E. Duell

(57) ABSTRACT

The present teachings are directed toward machine implemented method for estimating the ion density of the surface of either positive or negative electrode of a battery. The machine-implemented method includes dividing each electrode into N layers of active electrode material, determining the ion density variable for each one of the N layers of the active electrode, and determining the ion density of the electrode surface. In the presently disclosed method, the ion density variable of each of the N layers of the active electrode changes as a function of the difference between the respective ion density variables of adjacent N layers, and the ion density of the electrode surface changes as a function of the battery current and the difference between the respective ion density variables of adjacent N layers. The present method is particularly applicable to Li-ion batteries.

9 Claims, 6 Drawing Sheets

U.S. PATENT DOCUMENTS

| | | |
|---|---|---|
| 7,227,336 B1 | 6/2007 | Van Schalkwijk et al. |
| 7,248,023 B2 | 7/2007 | Takezawa et al. |
| 7,253,587 B2 | 8/2007 | Meissner |
| 7,327,147 B2 | 2/2008 | Koch |
| 7,400,115 B2 | 7/2008 | Plett |
| 2005/0189920 A1 | 9/2005 | Koch et al. |
| 2005/0189948 A1 | 9/2005 | Koch |
| 2005/0214646 A1 | 9/2005 | Kubota |
| 2005/0248315 A1 | 11/2005 | Hartley et al. |
| 2006/0093894 A1 | 5/2006 | Scott et al. |
| 2006/0208701 A1 | 9/2006 | Mikhaylik |
| 2006/0238168 A1 | 10/2006 | Matsuo et al. |
| 2006/0284617 A1 | 12/2006 | Kozlowski et al. |
| 2008/0003490 A1 | 1/2008 | Christensen et al. |
| 2009/0295337 A1 | 12/2009 | Ishikawa |

FOREIGN PATENT DOCUMENTS

| | | |
|---|---|---|
| JP | 10-290535 | 10/1998 |
| JP | 2006-158161 | 6/2006 |

OTHER PUBLICATIONS

S. Santhanagopalan, R.E. White, "Online estimation of the state of charge of a lithium ion cell," Journal of Power Sources, vol. 161 (2006), pp. 1346-1355, Elsevier, B.V.

* cited by examiner

METHOD OF ESTIMATING SURFACE ION DENSITY

BACKGROUND

1. Field of the Invention

The present teachings relate to a machine implemented method for estimating the ion density of the surface of either positive or negative electrode of a battery. This machine-implemented method includes dividing each electrode into N layers of active electrode material, determining a battery current applied to the electrode of the battery, determining the ion density variable for each one of the N layers of the active electrode material, and then determining the ion density of the electrode surface.

2. Discussion of the Related Art

One known battery management system that determines the state of charge of the battery by receiving signals representative of physical quantities of the battery is set forth in U.S. Pat. No. 6,016,047. Another known method for determining various variables, including electrolyte concentration, of a battery subdivides the battery volume into at least two electrolyte volume components, and is set forth in U.S. Pat. No. 7,327,147.

A need exists for a method that accurately determines the ion density of the surface of either the positive or negative electrode of a battery which information can be utilized to control a battery charging system, which can in turn, lead to an improved energy storage device, particularly for automotive applications.

SUMMARY

The present teachings are directed to a machine implemented method for estimating the ion density of the surface of either positive or negative electrode of a battery. The machine-implemented method includes dividing each electrode into N layers of active electrode material, determining a battery current applied to the electrode of the battery, determining the ion density variable for each one of the N layers of the active electrode material, and determining the ion density of the electrode surface. The ion density variable of each of the N layers of the active electrode material is a function of the difference between the respective ion density variables of adjacent N layers, while the ion density of the electrode surface is a function of the battery current and the difference between the respective ion density variables of adjacent N layers.

Also taught by the present disclosure is a battery charging device for a battery including a battery, a battery charger for charging the battery, and a charging control means. The charging control means can include a machine implemented method for estimating the ion density of the surface of either positive or negative electrode of the battery. This machine-implemented method can include dividing each electrode into N layers of active electrode material, determining a battery current applied to the electrode of the battery, determining the ion density variable for each one of the N layers of the active electrode material, and determining the ion density of the electrode surface. In this machine-implemented method, the ion density variable of each of the N layers of the active electrode material can be a function of the difference between the respective ion density variables of adjacent N layers, and the ion density of the electrode surface can be a function of the battery current and the difference between the respective ion density variables of adjacent N layers.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
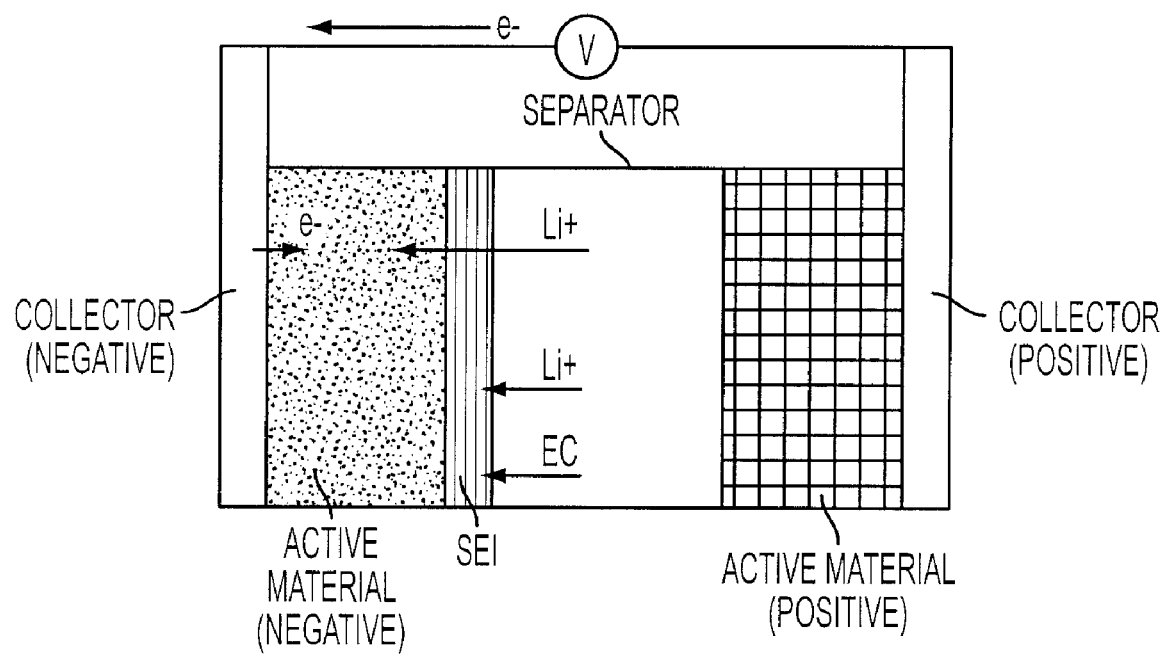
FIG. 1 is a schematic of a Li-ion battery.

The present disclosure teaches a machine implemented method for estimating the ion density of the surface of either positive or negative electrode of a battery. This method can include the steps of dividing each electrode into N layers of active electrode material; determining a battery current applied to the electrode of the battery; determining the ion density variable for each one of the N layers of the active electrode material; and then determining the ion density of the electrode surface. In the presently disclosed method, the ion density variable of each of the N layers of the active electrode material can be a function of the difference between the respective ion density variables of adjacent N layers, and the ion density of the electrode surface can be a function of the battery current and the difference between the respective ion density variables of adjacent N layers.

The N variable of the present method can be two or more, and can be as large a number as suitable for use of the present method. N can be selected by one of skill in the art so as to provide a balance between accuracy of the presently disclosed method and the ease of solution.

In the presently disclosed machine implemented method, the ion density of the electrode surface can be equal to the ion density variable of the $0^{th}$ layer of active electrode material. More specifically, the ion density of the $0^{th}$ layer of active electrode material comprises the solution to the following equation:

$$C_{0j}(k+1) = C_{0j}(k) - D_{diffj}(C_{0j}(k) - C_{1j}(k)) + \frac{NT_c}{3600}I_b(k).$$

In the equations presented herein, j=n for the negative electrode, and j=p for the positive electrode.

In the machine implemented method according to the present disclosure, the ion density variable for each of the $1^{st}$ through the $N-2^{th}$ layer of active electrode material comprises the respective solutions to the following equation:

$$C_{ij}(k+1) = C_{ij}(k) + D_{diffj}(C_{i-1j}(k) - C_{ij}(k)) - D_{diffj}(C_{ij}(k) - C_{i+1j}(k))$$

for i equal to 1 to N−2.

Also for the presently disclosed machine implemented method, the ion density variable of the $N-1^{th}$ layer of active electrode material comprises the solution to the following equation:

$$C_{N-1j}(k+1) = C_{N-1j}(k) + D_{diffj}(C_{N-2j}(k) - C_{N-1j}(k)).$$

The presently disclosed machine implemented method can be applied to nearly any kind of battery, and in some cases, the battery can be a lithium ion battery.

The presently disclosed method can include the assumption that either of the positive or negative electrode can consist of N layers of active electrode material, and that the diffusion speed of ions within the active electrode material can be proportional to the difference between ion densities at adjacent layers.

The presently disclosed method provides an accurate model of a battery's behavior, and can be favorably compared to one known model used to estimate a battery's internal states, the Single Particle Battery model. This model is presented in detail in, at least, two technical papers, "Cycle Life Modeling of Lithium-Ion Batteries," G. Ning, B. N. Popov, Journal of Electrochemical Society 151 (2004), pages A1584-A1591, and "Online estimation of the state of charge of a lithium ion cell," S. Santhanagopalan, R. E. White, Journal of Power Sources 161 (2006), pages 1346-1355.

The present disclosure also can include a battery charging device for a battery involving a battery, a battery charger for charging the battery, and a charging control means including a machine implemented method for estimating the ion density of the surface of either positive or negative electrode of the battery. The machine-implemented method can include the steps of:

dividing each electrode into N layers of active electrode material;

determining a battery current applied to the electrode of the battery;

determining the ion density variable for each one of the N layers of the active electrode material; and determining the ion density of the electrode surface. The ion density variable of each of the N layers of the active electrode material can be a function of the difference between the respective ion density variables of adjacent N layers, and the ion density of the electrode surface can be a function of the battery current and the difference between the respective ion density variables of adjacent N layers.

One embodiment of the presently disclosed battery charging device can include a generator. A suitable example of a generator is the generator as found in automotive applications, for instance, a generator of a hybrid electric vehicle. Hybrid electric vehicle refers to vehicles that can incorporate two different sources of drive train power, for instance, an electric motor, and additionally, an internal combustion engine, for example, a gasoline or diesel powered engine.

A typical Li ion cell is illustrated in FIG. 1. The diffusion of lithium in the active electrode material at the electrodes can be described by use of Fick's Second Law:

$$\frac{dC_j^{avg}}{dt} + \frac{15D_j}{R_j^2}(C_j^{avg} - C_j^s) = 0 \tag{1}$$

$$C_j^{avg}|_{t=0} = C_j^0 \tag{2}$$

$$J_j + \frac{5D_j}{R_j}(C_j^s - C_j^{avg})F_{aj} = 0 \tag{3}$$

where $C_j^{avg}$ Average ion density at active material; j=n (negative); j=p (positive)

$C_j^S$ Ion density at surface of active material; j=n (negative); j=p (positive), and $J_j^{Li}$ Current density at each electrode; j=n (negative); j=p (positive).

For the known single particle model, surface ion density, $C_j^S$, can be calculated as set forth in Eq. (4), and by modulating Eq. (3) above. The result of the single particle model is seen clearly when a pulse current is passed through, or applied to, the electrode, and then suspended, such that $J_j$ is equal to zero, the average ion density, $C_j^{avg}$, become a constant, and thus the second term of Eq. (4) becomes zero.

$$C_j^s = C_j^{avg} - \frac{R_j I_j}{5D_j F_{aj}} \tag{4}$$

Figure 1A:
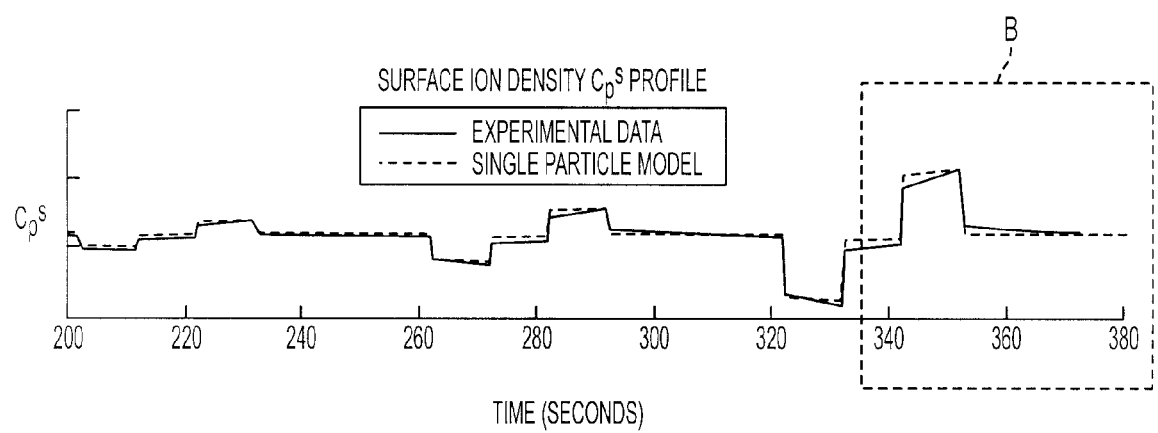
FIGS. 1A and 1B are graphical representations of the single particle model versus experimental results.
Figure 1B:
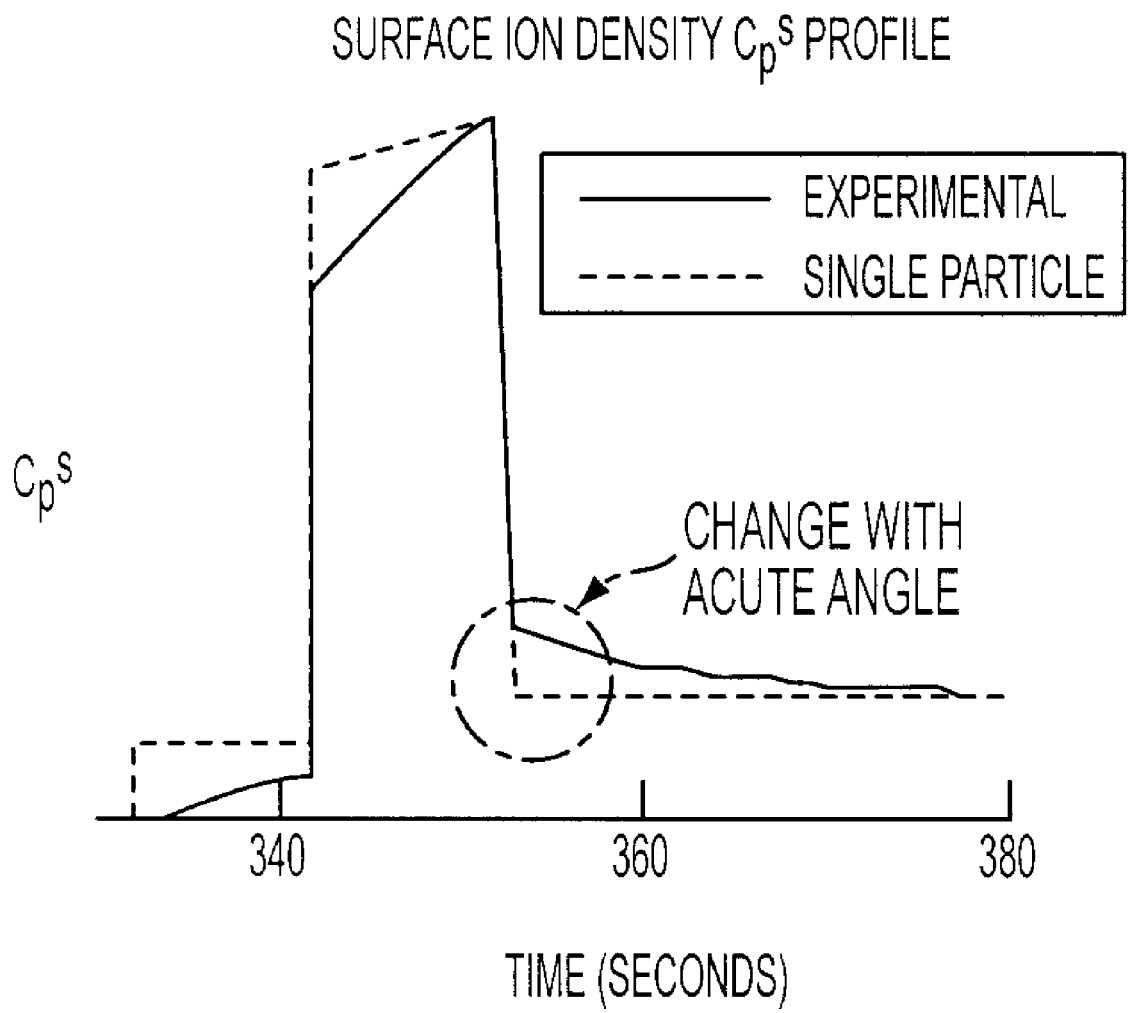
Figure 2:
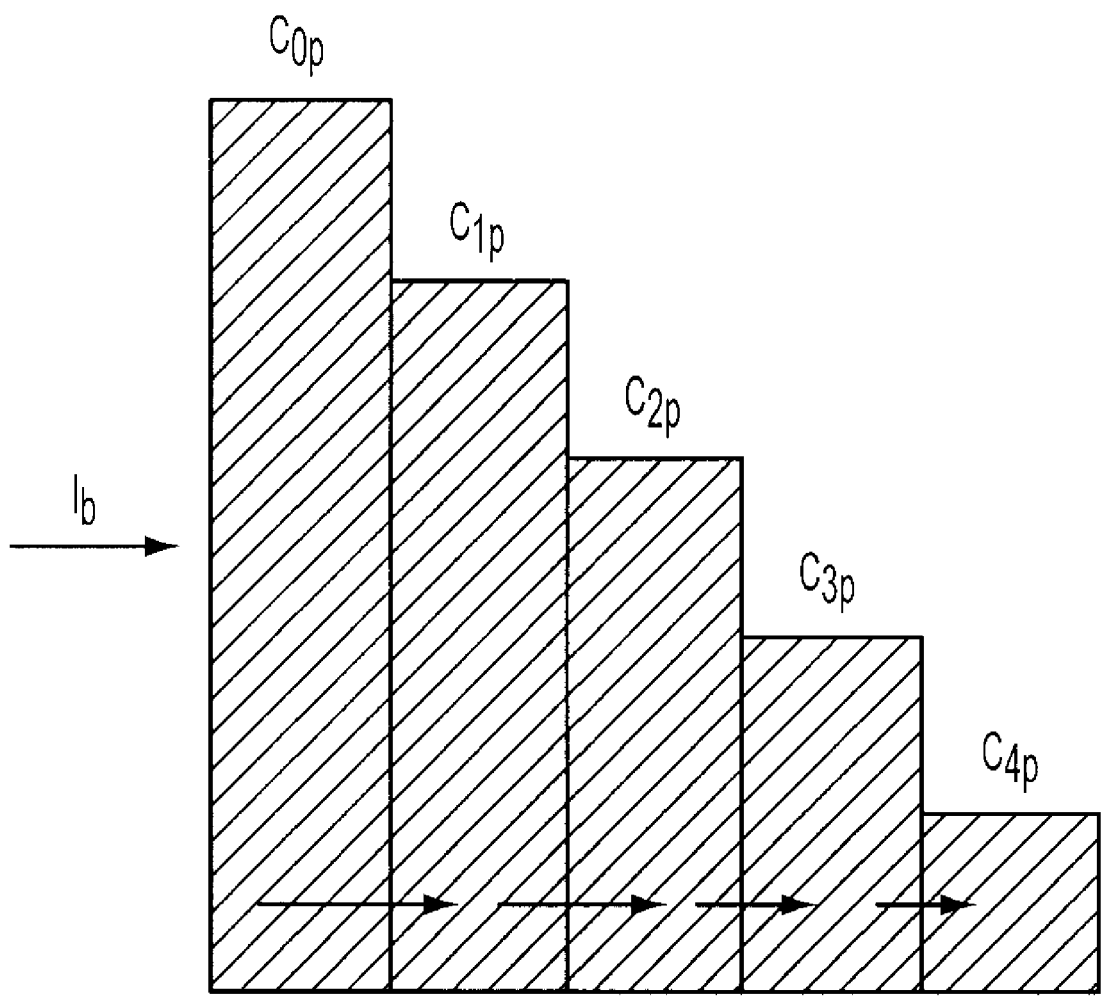
FIG. 2 is a graphical representation of an electrode divided into multiple layers.

Upon a change in current, with the single particle model, a sharp fast change in surface ion density over time is predicted, while the experimental results provide a slower change in the surface ion density. These results are clearly seen in FIGS. 1A and 1B. Note, in the blown-up FIG. 1B, the gradual changes in surface ion density measured during experimental tests and sharper changes predicted by the single particle model.

For the presently disclosed machine-implemented method, the model can utilize an electrode that is divided into N number of equivalent layers, with the first layer numbered 0. This multi-layer model can be solved via Equations (5) through (8) set forth below. The presently disclosed multi-layer model can assume that either of the positive or negative electrode are made up of N layers of active electrode material, and that the ionic diffusion speed within the active electrode material can be proportional to the difference between ion densities at adjacent layers.

$$C_{0j}(k+1) = C_{0j}(k) - D_{diffj}(C_{0j}(k) - C_{1j}(k)) + \frac{NT_c}{3600}I_b(k) \tag{5}$$

$$C_{ij}(k+1) = C_{ij}(k) + D_{diffj}(C_{i-1j}(k) - C_{ij}(k)) - D_{diffj}(C_{ij}(k) - C_{i+1j}(k)) \tag{6}$$

$$C_{N-1j}(k+1) = C_{N-1j}(k) + D_{diffj}(C_{N-2j}(k) - C_{N-1j}(k)) \tag{7}$$

$$C_{0j} = C_j^s \tag{8}$$

In the equations set forth herein, the following definitions apply:

$I_b$ Current to the battery in C rate $C_{ij}$ Normalized Li ion density of electrode active material at each layer, j=n (negative), j=p (positive), i=0 . . . N $C_j^S$ Normalized Li ion density at surface of active material, j=n (negative), j=p (positive)

$D_{diff j}$ Diffusion coefficient, j=n (negative), j=p (positive), and $T_c$ Update interval (sec).

Figure 3A:
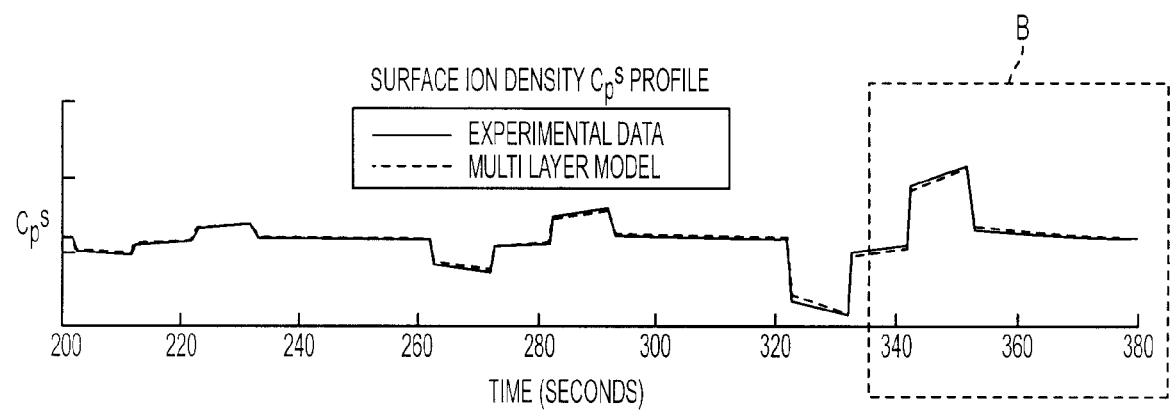
FIGS. 3A and 3B are graphical representations of the presently disclosed multi-layer model versus experimental results.
Figure 3B:
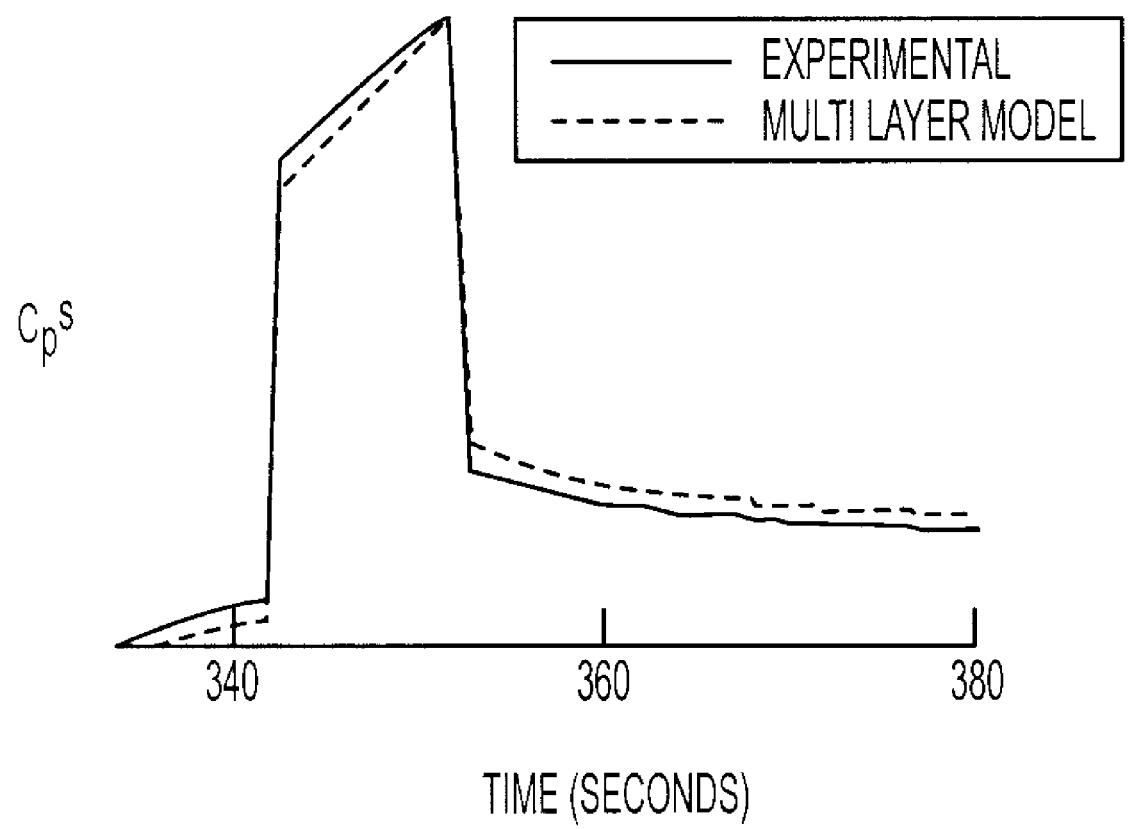

The results obtained by use of the presently disclosed multi-layer model and the machine-implemented method are graphically presented in FIGS. 3A and 3B. In the blown-up FIG. 3B, the close approximation obtained by the multi-layer model to the gradual changes in surface ion density measured during experimental tests is clearly observed.

As used herein, "adjacent" refers to articles or layers having a common boundary or edge, that is, touching.

The present application is related to co-pending U.S. patent application Ser. No. 12/129,416, filed May 29, 2008, and hereby incorporates said application herein in its entirety.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

The invention claimed is:

1. A machine implemented method for estimating the ion density of the surface of either positive or negative electrode of a battery, the machine-implemented method comprising:
   dividing each electrode into N layers of active electrode material;
   determining a battery current applied to the electrode of the battery;
   determining the ion density variable for each one of the N layers of the active electrode material; and
   determining the ion density of the electrode surface, and
   wherein the ion density variable of each of the N layers of the active electrode material comprises a function of the difference between the respective ion density variables of adjacent N layers, and
   wherein the ion density of the electrode surface comprises a function of the battery current and the difference between the respective ion density variables of adjacent N layers.

2. The machine implemented method according to claim 1, wherein the ion density of the electrode surface comprises the ion density variable of the $0^{th}$ layer of active electrode material.

3. The machine implemented method according to claim 1, wherein the ion density of the $0^{th}$ layer of active electrode material comprises the solution to the following equation:

$$C_{0j}(k+1) = C_{0j}(k) - D_{diffj}(C_{0j}(k) - C_{1j}(k)) + \frac{NT_c}{3600}I_b(k).$$

4. The machine implemented method according to claim 1, wherein the ion density variable for each of the $1^{st}$ through the N-$2^{th}$ layer of active electrode material comprises the respective solutions to the following equation:

$$C_{ij}(k+1)=C_{ij}(k)+D_{diffj}(C_{i-1j}(k)-C_{1j}(k))-D_{diffj}(C_{ij}(k)-C_{i+1j}(k))$$

for i equal to 1 to N−2.

5. The machine implemented method according to claim 1, wherein the ion density variable of the N−$1^{th}$ layer of active electrode material comprises the solution to the following equation:

$$C_{N-1j}(k+1)=C_{N-1j}(k)+D_{diffj}(C_{N-2j}(k)-C_{N-1j}(k)).$$

6. The machine implemented method according to claim 1, wherein the battery comprises a lithium ion battery.

7. A battery charging device for a battery comprising:
   a battery;
   a battery charger for charging the battery; and
   a charging control means comprising a machine implemented method for estimating the ion density of the surface of either positive or negative electrode of the battery, the machine-implemented method comprising:
   dividing each electrode into N layers of active electrode material;
   determining a battery current applied to the electrode of the battery;
   determining the ion density variable for each one of the N layers of the active electrode material; and
   determining the ion density of the electrode surface, and
   wherein the ion density variable of each of the N layers of the active electrode material comprises a function of the difference between the respective ion density variables of adjacent N layers, and
   wherein the ion density of the electrode surface comprises a function of the battery current and the difference between the respective ion density variables of adjacent N layers.

8. A battery charging device for a battery according to claim 7, wherein the battery charger for charging the battery comprises a generator.

9. A battery charging device for a battery according to claim 7, wherein the battery charger for charging the battery comprises a generator for a hybrid electric vehicle.

* * * * *